US010490152B2

(12) United States Patent
Park et al.

(10) Patent No.: US 10,490,152 B2
(45) **Date of Patent: *Nov. 26, 2019**

(54) DISPLAY DEVICE WITH SOURCE INTEGRATED CIRCUITS HAVING DIFFERENT CHANNEL NUMBERS

(71) Applicant: Samsung Display Co., Ltd., Yongin-Si, Gyeonggi-Do (KR)

(72) Inventors: Dong-Won Park, Hwaseong-si (KR); Bong-Hyun You, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 2 days.

This patent is subject to a terminal disclaimer.

(21) Appl. No.: 15/788,294

(22) Filed: Oct. 19, 2017

(65) Prior Publication Data

US 2018/0040287 A1 Feb. 8, 2018

Related U.S. Application Data

(63) Continuation of application No. 14/153,469, filed on Jan. 13, 2014, now Pat. No. 9,824,660.

(30) Foreign Application Priority Data

Aug. 22, 2013 (KR) ........................ 10-2013-0099648

(51) Int. Cl.
*G06F 3/038* (2013.01)
*G09G 5/00* (2006.01)
*G09G 3/36* (2006.01)

(52) U.S. Cl.
CPC ... *G09G 3/3685* (2013.01); *G09G 2300/0426* (2013.01); *G09G 2370/08* (2013.01)

(58) Field of Classification Search
None
See application file for complete search history.

(56) References Cited

U.S. PATENT DOCUMENTS 5,870,163 A * 2/1999 Watanabe ............. G02F 1/1345 349/149
6,262,704 B1 * 7/2001 Kurumisawa ........ G09G 3/3622 345/98

(Continued)

FOREIGN PATENT DOCUMENTS

JP 2005215007 A 8/2005
KR 1020060011918 A 2/2006

(Continued)

OTHER PUBLICATIONS

Korean Office Action for Application No. 10-2013-0099648 dated Jun. 26, 2019 enumerating the above references listed in the Korean Office Action.

*Primary Examiner* — Lunyi Lao
*Assistant Examiner* — Kirk W Hermann
(74) *Attorney, Agent, or Firm* — Cantor Colburn LLP

(57) ABSTRACT

A display device includes a display panel, a timing controller which receives a first image signal and a first control signal from an external device and outputs a second image signal and a second control signal, and a data driving part including a plurality of source integrated circuits ("IC"s) having different channel numbers based on a distance thereof from the timing controller, in which the data driving part receives the second image signal and the second control signal and outputs a third image signal and a third control signal to the display panel.

19 Claims, 4 Drawing Sheets

(56) References Cited

U.S. PATENT DOCUMENTS

| | | | | |
|---|---|---|---|---|
| 8,749,535 | B2 | 6/2014 | Kim et al. | |
| 9,881,585 | B2 * | 1/2018 | Takahashi | G09G 5/008 |
| 2002/0075249 | A1 * | 6/2002 | Kubota | G09G 3/2011 345/204 |
| 2003/0117566 | A1 | 6/2003 | Park | |
| 2005/0128170 | A1 | 6/2005 | Kang et al. | |
| 2005/0286004 | A1 | 12/2005 | Lee | |
| 2006/0001637 | A1 * | 1/2006 | Pak | G09G 3/3677 345/100 |
| 2007/0120788 | A1 * | 5/2007 | Tsai | G09G 3/3611 345/87 |
| 2008/0174539 | A1 * | 7/2008 | Hu | G09G 3/2096 345/99 |
| 2010/0045588 | A1 * | 2/2010 | Lee | G09G 3/2096 345/99 |
| 2010/0225637 | A1 | 9/2010 | Jeon et al. | |
| 2011/0069061 | A1 * | 3/2011 | Nakamura | G09G 3/3225 345/214 |
| 2011/0157533 | A1 * | 6/2011 | Nam | G02F 1/136286 349/139 |
| 2011/0273655 | A1 | 11/2011 | Lin et al. | |
| 2012/0075268 | A1 | 3/2012 | Chung et al. | |
| 2012/0133661 | A1 * | 5/2012 | Lee | G09G 3/3275 345/558 |
| 2012/0162161 | A1 | 6/2012 | Ino et al. | |
| 2014/0168292 | A1 * | 6/2014 | Yao | G09G 3/3208 345/694 |

FOREIGN PATENT DOCUMENTS

| | | | |
|---|---|---|---|
| KR | 1020070049922 | A | 5/2007 |
| KR | 1020080036844 | A | 4/2008 |
| KR | 1020100038825 | A | 4/2010 |
| KR | 1020100099927 | A | 9/2010 |

* cited by examiner

DISPLAY DEVICE WITH SOURCE INTEGRATED CIRCUITS HAVING DIFFERENT CHANNEL NUMBERS

This application is a continuation of U.S. patent application Ser. No. 14/153,469, filed on Jan. 13, 2014, which claims priority to Korean Patent Application No. 10-2013-0099648, filed on Aug. 22, 2013, and all the benefits accruing therefrom under 35 U.S.C. § 119, the content of which in its entirety is herein incorporated by reference.

BACKGROUND

1. Field

Exemplary embodiments of the invention relate to a display device with enhanced signal quality.

2. Description of the Related Art

Generally, a liquid crystal display ("LCD") device includes an LCD panel for displaying images using a light transmittance of liquid crystal molecules and a backlight assembly disposed below the LCD panel to provide the LCD panel with light. The LCD panel includes an array substrate having a plurality of pixel electrodes and a plurality of thin-film transistors ("TFT") electrically connected to the pixel electrodes, respectively, a color filter substrate having a common electrode and a plurality of color filters, and a liquid crystal layer interposed between the array substrate and the color filter substrate. An alignment of the liquid crystal layer is varied by an electric field generated between the pixels and the common electrode, such that transmittance of lights transmitted through the liquid crystal layer is controlled.

The LCD panel typically includes a control circuit board for driving the liquid crystal layer and a source circuit board electrically connected to the control circuit board. An LCD device may include an LCD panel, a source circuit board, a control circuit board, and a cable for electrically connecting to the source circuit board and the control circuit board. The LCD device may further include a plurality of source chip-on-film ("COF") electrically connected to the source circuit board and the control circuit board.

The source COF is electrically connected to the source circuit board and a data line of the LCD panel. In such a LCD device, a source integrated circuit ("IC") may be mounted on the source COF. A plurality of signal lines for transmitting digital video data and timing control signals that are provided from the control circuit board may be provided on the source circuit board. Various control circuits, a data transmitting circuit, etc., may be mounted on the control circuit board. The source COF and the source circuit board may be electrically connected to each other through an on-lead-bonding ("OLB") process.

As the LCD device has a large-scaled size and a slim thickness, a size of a source circuit board and a length of the source circuit may be increased. Thus, differences between transmitting paths may become greater, that is, a connection length between a control circuit board and a display panel may be short in a source circuit board disposed on a middle area of the display panel. However, in a source circuit board disposed on a peripheral area of the display panel, a connection length between a control circuit board and the display panel is long. When a distant between the source IC and the control circuit board is substantially great, a signal transmitting length is long and a transmitting intermediate medium is varied several times, such that a signal quality may be deteriorated as a signal outputted from the control board is transmitted via transmitting medium such as printed circuit boards ("PCB"s), cables or COF, for example.

SUMMARY

Exemplary embodiments of the invention provide a display device with improved signal quality by disposing source integrated circuits ("IC"s) having different channel numbers based on a distance between the source IC and a timing controller.

According to an exemplary embodiment of the invention, a display device includes a display panel, a timing controller which receives a first image signal and a first control signal from an external device and outputs a second image signal and a second control signal, and a data driving part including a plurality of source ICs having different channel numbers based on a distance thereof from the timing controller, in which the data driving part receives the second image signal and the second control signal and outputs a third image signal and a third control signal to the display panel.

In an exemplary embodiment, the distance between each of the source ICs and the timing controller may be substantially inversely proportional to the channel number.

In an exemplary embodiment, the data driving part may include a first source IC group including a plurality of first source ICs, each having a first channel number, a second source IC groups including a plurality of second source ICs, each having a second channel number, a third source IC group including a plurality of third source ICs, each having the second channel number, and a fourth source IC group including a plurality of fourth source ICs, each having the first channel number, where the distance of the first or fourth source IC group from the timing controller is greater than the distance of the second or third source IC group from the timing controller.

In an exemplary embodiment, the first to fourth source groups may be disposed on different circuit boards, the second and third source IC groups may be connected to the timing controller through a cable, the first source IC group may be connected to the second source IC group through a cable, and the fourth source IC group may be connected to the third source IC group through a cable.

In an exemplary embodiment, the first and second source IC groups may be disposed in a chip-on-glass ("COG") type on the display panel, the second and third source IC groups may be connected to the timing controller through a cable, the first source IC group may be connected to the second source IC group through a conductive wiring disposed on the display panel, and the fourth source IC group may be connected to the third source IC group through a conductive wiring disposed on the display panel.

In an exemplary embodiment, the first channel number may be less than the second channel number.

In an exemplary embodiment, the display panel may include a plurality of data lines connected to the data driving part, the number of the data lines corresponding to the first source IC group may be substantially equal to the number of the data lines corresponding to the second source IC group, and the number of the data lines corresponding to the third source IC group may be substantially equal to the number of the data lines corresponding to the fourth source IC group.

In an exemplary embodiment, the number of the first source ICs may be greater than the number of the second source ICs, and the number of the fourth source ICs may be greater than the number of the third source ICs.

In an exemplary embodiment, a clock frequency of the first source IC may be different from a clock frequency of the second source IC.

In an exemplary embodiment, a clock frequency of the first source IC may be lower than a clock frequency of the second source IC.

In an exemplary embodiment, the display panel may include a plurality of data lines connected to the data driving part, the display device may further include: a plurality of first connection lines disposed in a first area between the first source ICs and the data lines of the display panel; and a plurality of second connection lines disposed in a second area between the second source ICs and the data lines of the display panel, and a width of the first area may be less than a width of the second area.

In an exemplary embodiment, the display panel may include a plurality of data lines connected to the data driving part, the display device may further include: a plurality of first connection lines connected between the first source ICs and the data lines of the display panel; and a plurality of second connection lines connected between the second source ICs and the data lines of the display panel, and an average length of the first connection lines may be greater than an average length of the second connection lines.

In an exemplary embodiment, the timing controller may include a first timing control module which controls an operation of the first source ICs, a second timing control module which controls an operation of the second source ICs, a third timing control module which controls an operation of the third source ICs, and a fourth timing control module which controls an operation of the fourth source ICs.

In an exemplary embodiment, the operations of the first to fourth source ICs may be synchronized with each other.

In an exemplary embodiment, the second and third timing control modules may have a substantially same bandwidth as each other, and the first and fourth timing control modules may have a substantially same bandwidth as each other.

In an exemplary embodiment, a bandwidth of the first timing control module may be different from a bandwidth of the second timing control module.

In an exemplary embodiment, the first to fourth timing control modules may be realized in the different chips.

In an exemplary embodiment, the display device may further includes: a plurality of third connection lines disposed in a third area between the third source ICs and the data lines of the display panel; and a plurality of fourth connection lines disposed in a fourth area between the fourth source ICs and the data lines of the display panel, and a width of the third area may be greater than a width of the fourth area.

In an exemplary embodiment, the display device may further include: a plurality of third connection lines connected between the third source ICs and the data lines of the display panel; and a plurality of fourth connection lines connected between the fourth source ICs and the data lines of the display panel, and an average length of the third connection lines may be less than an average length of the fourth connection lines.

According to another exemplary embodiment of the invention, a display device includes a display panel, a timing controller which receives a first image signal and a first control signal from an external device and outputs a second image signal and a second control signal, and a data driving part including: a plurality of first source IC groups including a plurality of first source ICs, each having a first channel number; and a plurality of second source IC groups including a plurality of second source ICs, each having a second channel number less than the first channel number, where the distance of each of the first source IC groups from the timing controller is greater than the distance of each of the second source IC groups from the timing controller, and the data driving part receives the second image signal and the second control signal and outputs a third image signal and a third control signal to the display panel.

In an exemplary embodiment, the total channel number of the first source IC groups may be substantially equal to the total channel number of the second source IC groups.

According to exemplary embodiment of a display device, the number of channels of source IC far from a timing controller is less than the number of channels of source IC near to the timing controller, and a frequency of a clock for synchronizing is decreased to effectively prevent a signal from being deteriorated, such that signal discrimination of the source IC is increased and signal quality is thereby improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
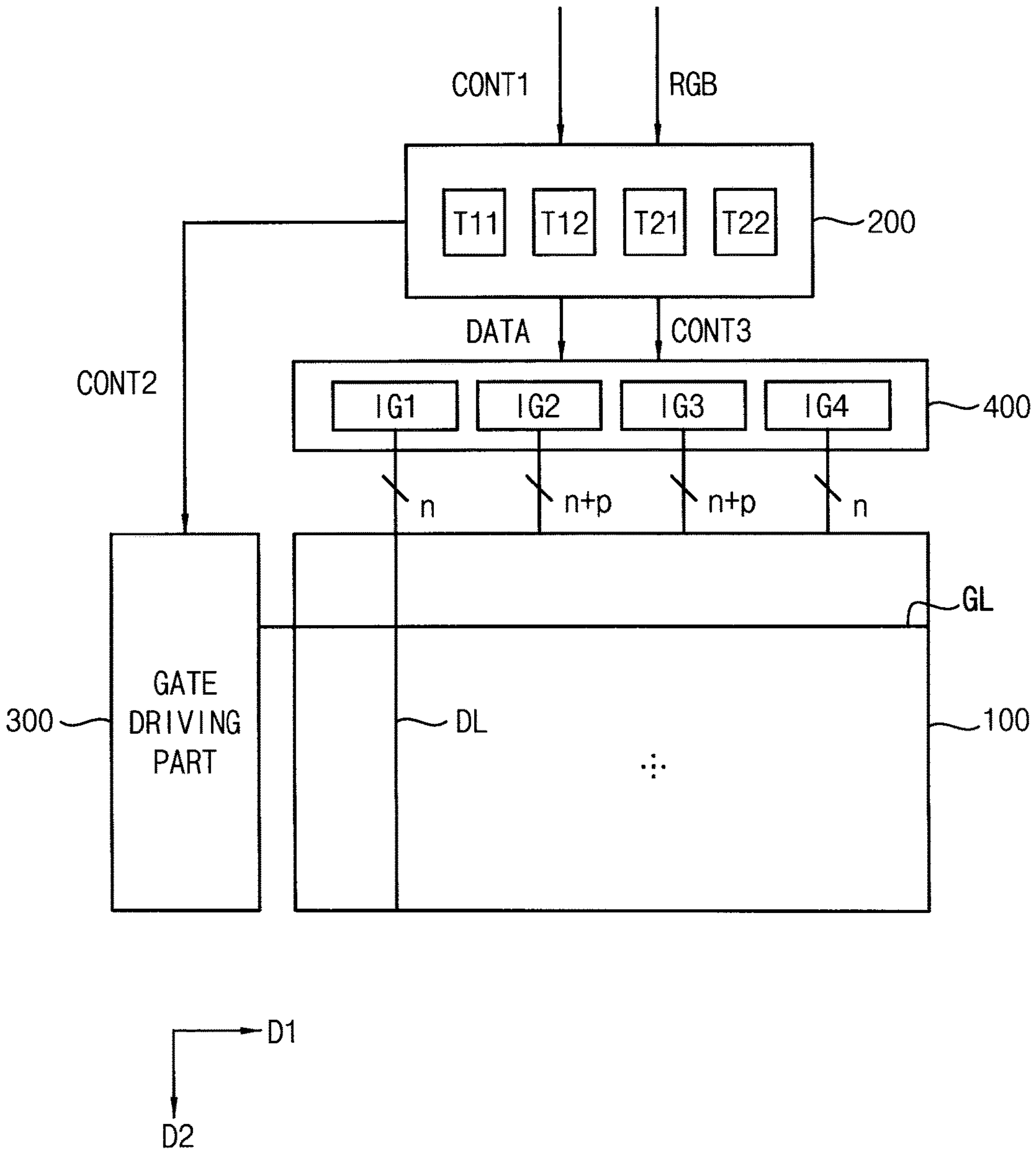
FIG. 1 is a block diagram schematically showing an exemplary embodiment of a display device, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of a display device, according to the invention, will be described in detail with reference to the accompanying drawings.

FIG. 1 is a block diagram schematically showing an exemplary embodiment of a display device, according to the invention.

Referring to FIG. 1, an exemplary embodiment of a display device includes a display panel 100, a timing controller 200, a gate driving part 300 and a data driving part 400.

The display panel 100 includes a plurality of gate lines GL, a plurality of data lines DL, and a plurality of unit pixels (not shown) electrically connected to the gate lines GL and the data lines DL, respectively. The gate lines GL extend substantially in a first direction D1, and the data lines DL extend substantially in a second direction D2. The first direction D1 may cross the second direction D2.

Each of the unit pixels may include a switching element (not shown), a liquid crystal capacitor (not shown) electrically connected to the switching element and a storage capacitor (not shown) electrically connected to the switching element. Each of the unit pixels may be disposed substantially in a matrix form.

The timing controller 200 receives a first image data RGB and a first control signal CONT1 from an external device (not shown). The first image data RGB may include a red image data, a green image data and a blue image data. The first control signal CONT1 may include a vertical synchronization signal, a horizontal synchronization signal, a master clock signal or a data enable signal, for example.

The timing controller 200 generates a second control signal CONT2, a third control signal CONT3 and a data signal DATA based on the first image signal RGB and the first control signal CONT1.

The timing controller 200 generates the second control signal CONT2 for controlling an operation of the gate driving part 300 in response to the first control signal CONT1, and outputs the second control signal CONT2 to the gate driving part 300 through a cable. The second control signal CONT2 may include a vertical start signal and a gate clock signal.

In one exemplary embodiment, for example, the timing controller 200 may provide the gate driving part 300 with a vertical synchronization signal for selecting a first gate line, a gate clock signal for sequentially selecting subsequent gate lines and an output enable signal for controlling an outputting of the gate driving part 300 through a cable.

The timing controller 200 generates the third control signal CONT3 for controlling an operation of the data driving part 400 based on the first control signal CONT1, and outputs the third control signal CONT3 to the data driving part 400 through a cable. The third control signal CONT3 may include a horizontal start signal and a load signal.

In one exemplary embodiment, for example, the timing controller 200 converts the first image signal RGB into red, green and blue data signals corresponding to a specification of the data driving part 400 and outputs the red, green and blue data signals to the data driving part 400 as the data signal DATA. In such an embodiment, the timing controller 200 may generate a horizontal synchronization start signal and a load signal for controlling an output timing of a data signal, and provide the data driving part 400 with the horizontal synchronization start signal and the load signal.

The gate driving part 300 generates a plurality of gate signals for driving the gate lines GL in response to the second control signal CONT2 received from the timing controller 200. The gate driving part 300 sequentially outputs the gate signals to the gate lines GL. In one exemplary embodiment, for example, the gate driving part 300 may generate the gate signals outputted to the gate lines GL based on the gate driving control signal CONT1 including a first clock signal, a second clock signal having a timing different from the first clock signal and a vertical start signal. In such an embodiment, the second clock signal may be a signal inverted from the first clock signal.

In an exemplary embodiment, the gate driving part 300 may be directly mounted on the display panel 100 or connected to the display panel 100 in a tape carrier package ("TCP") manner. Alternatively, the gate driving part 300 may be integrated on the display panel 100.

In an exemplary embodiment, the data driving part 400 includes a plurality of source integrated circuits ("IC"s) having different channel numbers from each other based on a distance thereof from the timing controller 200. The data driving part 400 receives the data signal DATA and the third control signal CONT3 to output a third image signal and a data control signal for outputting the third image signal to the display panel 300. In an exemplary embodiment, the channel of a source IC may correspond to data lines of the display panel 100. In an exemplary embodiment, the source IC may be mounted on a printed circuit board ("PCB"). Alternatively, the source IC may be mounted in a chip-on-glass ("COG") type on the display panel 100.

In an exemplary embodiment, the data driving part 400 includes a first source IC group IG1, a second source IC group IG2, a third source IC group IG3 and a fourth source IC group IG4 to receive the third control signal CONT3 and the data signal DATA from the timing controller 200. The data driving part 400 may convert a gamma reference voltage outputted from a gamma reference voltage generating part (not shown) to a data voltage of analog type. The data driving part 400 outputs the data voltage to the data lines DL.

In one exemplary embodiment, for example, the first to fourth source IC groups IG1, IG2, IG3 and IG4 may be disposed in a COG type on the display panel 100. In such an embodiment, the second source IC group IG2 may be connected to the timing controller 200 through a cable, and the third source IC group IG3 may be connected to the timing controller 200 through a cable. The first source IC group IG1 may be connected to the second source IC group IG2 through a conductive wiring disposed on the display panel 100, and the third source IC group IG3 may be connected to the fourth source IC group IG4 through a conductive wiring disposed on the display panel 100.

In one alternative exemplary embodiment, for example, the first to fourth source IC groups IG1, IG2, IG3 and IG4 may be disposed in different circuit boards. In such an embodiment, the second source IC group IG2 may be connected to the timing controller 200 through a cable, and the third source IC group IG3 may be connected to the timing controller 200 through a cable. The first source IC group IG1 may be connected to the second source IC group IG2 through a cable, and the third source IC group IG3 may be connected to the fourth source IC group IG4 through a cable.

In an exemplary embodiment, the first source IC group IG1 includes a plurality of first source ICs having a first channel number and disposed substantially distant from the timing controller 200. When viewed from a plan view of the display panel 100, the first source IC group IG1 may be disposed to correspond to a left side of the display panel 100. In an exemplary embodiment, the first source IC group IG1 is connected to n data lines. Here, 'n' denotes a natural number. In one exemplary embodiment, for example, where the first source IC group IG1 includes three first source ICs, the first channel number may be n/3. In one alternative exemplary embodiment, for example, where the first source IC group IG1 includes five first source ICs, the first channel number may be n/5.

In an exemplary embodiment, the second source IC group IG2 includes a plurality of second source ICs having a second channel number greater than the first channel number and disposed near the timing controller 200. When viewed from a plan view of the display panel 100, the second source IC group IG2 may be disposed to correspond to a center-left area of the display panel 100. In an exemplary embodiment, the second source IC group IG2 may be connected to (n+p) data lines. Here, 'n' and 'p' denote natural numbers. In one exemplary embodiment, for example, where the second source IC group IG2 includes three second source ICs, the second channel number may be (n+p)/3. In one alternative exemplary embodiment, for example, where the second source IC group IG2 includes five second source ICs, the second channel number may be (n+p)/5.

In an exemplary embodiment, the third source IC group IG3 includes a plurality of third source ICs having the second channel number and disposed near the timing controller 200. When viewed from a plan view of the display panel 100, the third source IC group IG3 may be disposed to correspond to a center-right area of the display panel 100. In an exemplary embodiment, the third source IC group IG3 is connected to (n+p) data lines. Here, 'n' and 'p' denote natural numbers. In one exemplary embodiment, for example, where the third source IC group IG3 includes three third source ICs, the second channel number may be (n+p)/3. In one alternative exemplary embodiment, for example, where the third source IC group IG3 includes five third source ICs, the second channel number may be (n+p)/5.

In an exemplary embodiment, the fourth source IC group IG4 includes a plurality of fourth source ICs having the first channel number to be disposed substantially distant from the timing controller 200. When viewed from a plan view of the display panel 100, the fourth source IC group IG4 may be disposed to correspond to a right side of the display panel 100. In an exemplary embodiment, the fourth source IC group IG4 is connected to n data lines. Here, 'n' denotes a natural number. In one exemplary embodiment, for example, where the fourth source IC group IG4 includes three fourth source ICs, the first channel number may be n/3. In one alternative exemplary embodiment, for example, where the fourth source IC group IG4 includes five fourth source ICs, the first channel number is n/5.

Each of the first to fourth source IC groups IG1, IG2, IG3 and IG4 may include a shift register (not shown), a latch (not shown), a signal processing part (not shown) and a buffer part (not shown). The shift register outputs a latch pulse to the latch. The latch temporarily stores the data signal DATA and then output the data signal DATA to the signal processing part. The signal processing part generates the data voltage of analog type based on the data signal DATA and the gamma reference voltage to output the data voltage to the buffer part. The buffer part compensates the data voltage to have a predetermined level, and then outputs the data voltage to the data lines DL.

In an exemplary embodiment, as shown in FIG. 1, the timing controller 200 includes a first timing control module T11, a second timing control module T12, a third timing control module T21 and a fourth timing control module T22.

The first timing control module T11 controls operations of the first source ICs disposed in the first source IC group IG1, and the second timing control module T12 controls operations of the second source ICs disposed in the second source IC group IG2.

The third timing control module T21 controls operations of the third source ICs disposed in the third source IC group IG3, and the fourth timing control module T22 controls operations of the fourth source ICs disposed in the fourth source IC group IG4.

The second and third timing control modules T12 and T21 have substantially the same bandwidth as each other, and the first and fourth timing control modules T11 and T22 have substantially the same bandwidth as each other. In such an embodiment, the bandwidth of the first timing control module T11 is different from the bandwidth of the second timing control module T12.

In an exemplary embodiment, where each of the first and fourth source IC groups IG1 and IG4 includes eight source ICs corresponding to 720 channels and each of the second and third source IC groups IG2 and IG3 includes six source ICs corresponding to 960 channels, a driving frequency of first and fourth source IC groups IG1 and IG4 corresponding with 720 channels is changed to decrease a speed of a pixel clock. In such an embodiment, a driving frequency divided by six is changed into a driving frequency divided by eight, thereby decreasing a speed of a pixel clock to decrease a bandwidth of a signal transmitted to a source IC, such that signal quality of an interface may be enhanced.

In one exemplary embodiment, for example, bandwidths of each source ICs disposed in the second source IC group IG2 controlled by the second timing control module T12 are about 1.65 gigabits per second ("Gbps"), and bandwidths of each source ICs disposed in the first source IC group IG1 controlled by the first timing control module T11 may be about 1.24 Gbps. Thus, a bandwidth of a signal transmitted to the source ICs of the first source IC group IG1 disposed relatively distant from the timing controller 200 is lower in comparison with a bandwidth of a signal transmitted to the source ICs of the second source IC group IG2 disposed relatively closed to the timing controller 200, such that signal quality of an interface for a source IC may be enhanced.

In an exemplary embodiment, where the display device includes timing control modules corresponding to different channels, that data between different source ICs are synchronized based on a synchronization of load control signal (e.g., the load signal).

As described above, according to an exemplary embodiment of the invention, signal quality is improved by reducing the number of channels of a source IC that has relatively low signal quality to transmit a signal through a bandwidth that a transmitting speed is decreased with respect to a source IC near to the timing controller 200 such that the signal quality is substantially improved.

Figure 2:
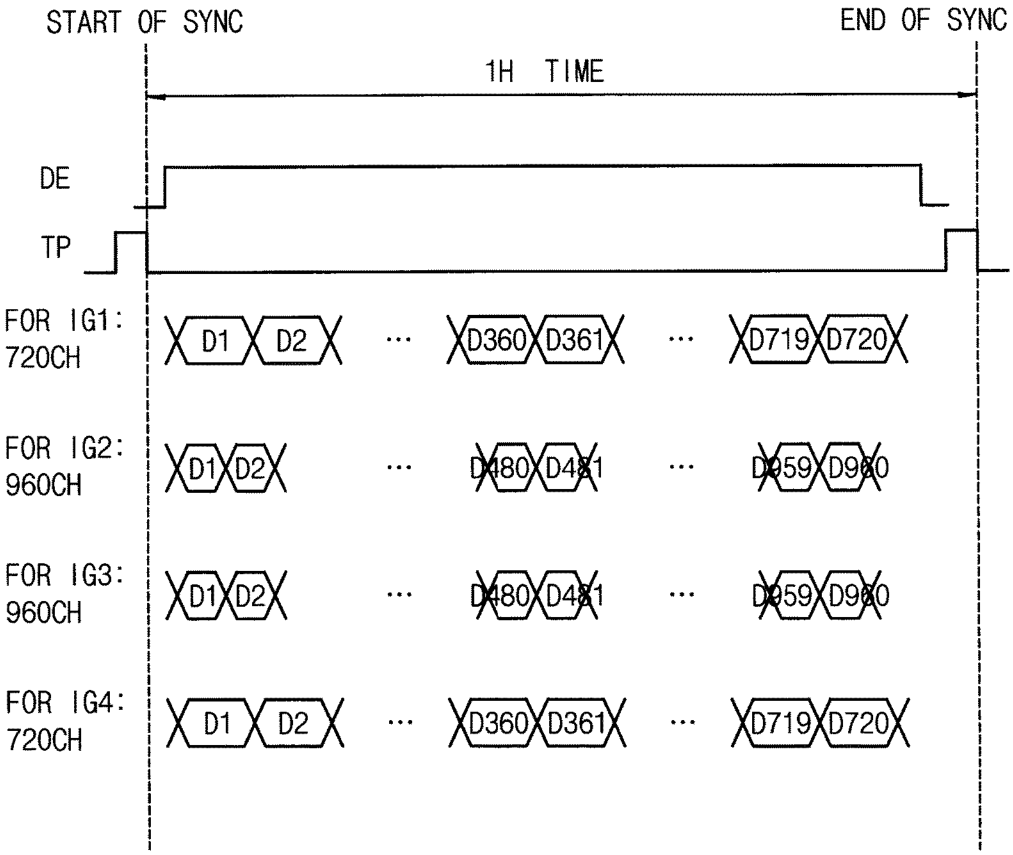
FIG. 2 is waveform diagram schematically showing signals of the display device shown in FIG. 1.

FIG. 2 is waveform diagram schematically showing signals of the display device shown in FIG. 1.

Referring to FIGS. 1 and 2, in one exemplary embodiment, for example, when a data enable signal DE of a first control signal CONT1 is activated after the load signal TP for controlling a timing of a data signal applied to a data line is activated, that is, after a start of synchronization SYNC, 720 data signals (e.g., D1 to D720) are loaded in 720 data lines corresponding to a first source IC group IG1, and 960 data signals (e.g., D1 to D960) are loaded in 960 data lines corresponding to a second IC group IG2.

In such an embodiment, 960 data signals are loaded in 960 data lines corresponding to a third source IC group IG3, and 720 data signals are loaded in 720 data lines corresponding to a fourth IC group IG4.

Data are transmitted in different clock frequencies; however, a data transmitted in the first to fourth source IC groups IG1, IG2, IG3 and IG4 is performed within one horizontal ("1H") period.

Figure 3A:
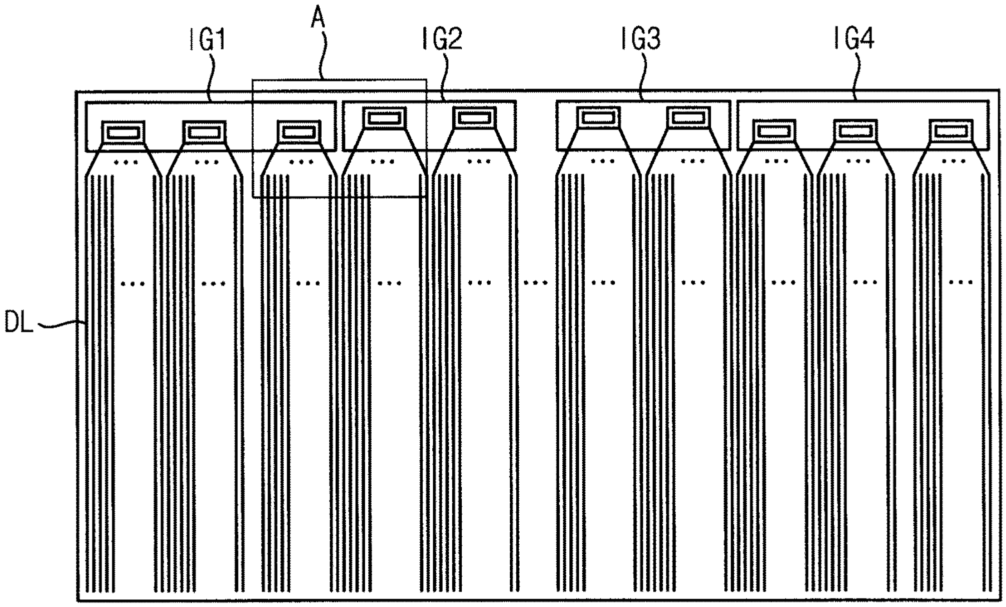
FIG. 3A is a plan view schematically showing an exemplary embodiment of a display panel shown in FIG. 1.
Figure 3B:
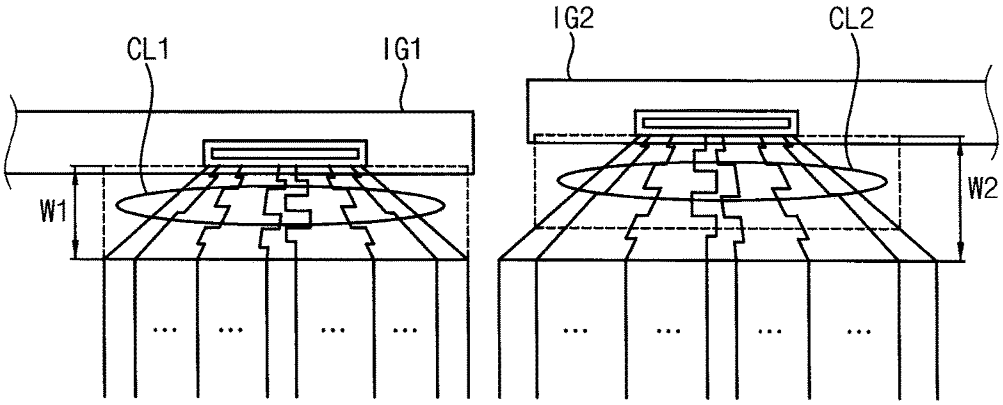
FIG. 3B is an enlarged view of a portion 'A' in FIG. 3A.

FIG. 3A is a plan view schematically showing an exemplary embodiment of a display panel shown in FIG. 1. FIG. 3B is an enlarged view of a portion 'A' in FIG. 3A.

Referring to FIGS. 1, 3A and 3B, the first source IC group IG1 and the fourth source IC group IG4 are disposed in an area relatively distant from the timing controller 200, and the second source IC group IG2 and the third source IC group IG3 are disposed in an area near the timing controller 200, such are nearer to the timing controller 200 than the first source IC group IG1 and the fourth source IC group IG4. In such an embodiment, the source ICs of the first and fourth source IC groups IG1 and IG4 are disposed relatively close to the data lines thereof, and the source ICs of the second and third source IC groups IG2 and IG3 are disposed relatively distant from the data line.

In such an embodiment, as shown in FIG. 3B, a width W1 of a first area, where a plurality of first connection lines CL1 that connects output terminals of a first source IC of the first source IC group IG1 and corresponding data lines of the display panel 100 is disposed, is less than a width W2 of a second area, where a plurality of second connection lines CL2 that connects output terminals of a second source IC of the second source IC group IG2 and corresponding data lines of the display panel 100 is disposed.

Although not shown in FIGS. 3A and 3B, a width of a third area, where a plurality of third connection lines (reference numeral is not indicated) that connects output terminals of a third source IC of the third source IC group IG3 and corresponding data lines of the display panel 100 is disposed, is greater than a width of a fourth area, where plural fourth connection lines (reference numeral is not indicated) that connect output terminals of a fourth source IC of the fourth source IC group IG4 and corresponding data lines of the display panel 100 is disposed.

An average length of the first connection lines CL1 that connect the output terminals of a first source IC of the first source IC group IG1 and the corresponding data lines of the display panel 100 is less than an average length of second connection lines CL2 that connect the output terminals of a second IC of the second source IC group IG2 and the corresponding data lines of the display panel 100. In an exemplary embodiment, the average length of the first connection lines CL1 may be a value acquired by dividing a total length of the first connection lines CL1 by the number of the first connection lines CL1, and the average length of the second connection lines CL2 may be a value acquired by dividing a total length of the second connection lines CL2 by the number of the second connection lines CL2.

Although not shown in FIGS. 3A and 3B, an average length of third connection lines that connect the output terminals of a third source IC of the third source IC group and the corresponding data lines of the display panel 100 is less than an average length of fourth connection lines that connect the output terminals of a fourth IC of the fourth source IC group and the corresponding data lines of the display panel 100. In an exemplary embodiment, the average length of the third connection lines may be a value acquired by dividing a total length of the third connection lines by the number of the third connection lines, and the average length of the fourth connection lines may be a value acquired by dividing a total length of the fourth connection lines by the number of the fourth connection lines.

As described above, according to an exemplary embodiment of the invention, the number of channels of source ICs, which is relatively distant from the timing controller, is less than the number of channels of source ICs relatively close to the timing controller, such that deterioration of a signal quality is effectively prevented or substantially reduced. In one exemplary embodiment, for example, six ICs having 960 channels are disposed on an area near to the timing controller (i.e., 960 channels×6=5,760 channels), and eight ICs having 720 channels are disposed on an area far from the timing controller (i.e., 720 channels×8=5,760 channels). In such an embodiment, data between ICs near to each other are synchronized with each other. That is, the load control signals TP are synchronized with each other.

In FIGS. 3A and 3B, in an exemplary embodiment, the first to fourth source IC groups may be disposed in COG type on a display panel. Alternatively, the first to fourth source IC groups may be disposed on different circuit boards to be connected to the display panel through a cable.

Figure 4:
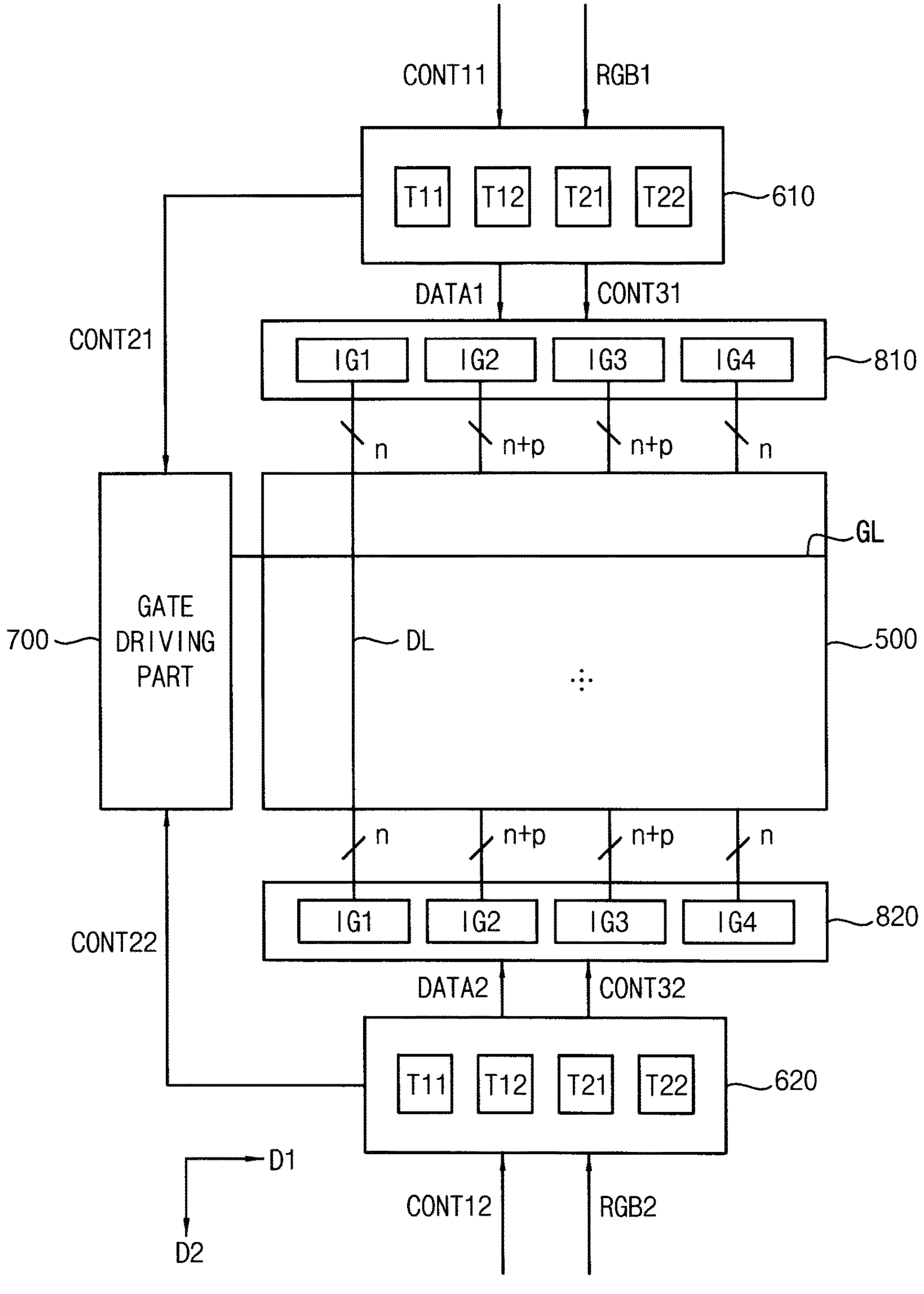
FIG. 4 is a block diagram schematically showing an alternative exemplary embodiment of a display device, according to the invention.

FIG. 4 is a block diagram schematically showing an alternative exemplary embodiment of a display device, according to the invention.

Referring to FIG. 4, an alternative exemplary embodiment of a display device includes a display panel 500, a first timing controller 610, a second timing controller 620, a gate driving part 700, a first data driving part 810 and a second data driving part 820.

The display panel 500 shown in FIG. 4 is substantially the same as the display panel 100 shown in FIG. 1, and thus any repetitive detailed description thereof may hereinafter be omitted.

The first timing controller 610 receives a first image signal RGB1 and a first input control signal CONT11 from an external device (not shown), and the second timing controller 620 receives a second image signal RGB2 and a second input control signal CONT12 from an external device (not shown). Each of the first and second image signals RGB1 and RGB2 may include a red image data, a green image data and a blue image data.

In an exemplary embodiment, the first image signal RGB1 may be displayed on an upper area of the display panel 500, and the second image signal RGB2 may be displayed on a lower area of the display panel 500. Each of the first and second input control signals CONT11 and CONT12 may include a vertical synchronization signal, a horizontal synchronization signal, a master clock signal and a data enable signal, for example.

The first timing controller 610 generates a first gate control signal CONT21, a first data control signal CONT31 and a first data signal DATA1 in response to the first image signal RGB1 and the first input control signal CONT11, and the second timing controller 620 generates a second gate control signal CONT22, a second data control signal CONT32 and a second data signal DATA2 in response to the second image signal RGB2 and the second input control signal CONT12.

The first timing controller 610 generates the first gate control signal CONT21 for controlling an operation of the gate driving part 700 and outputs the first gate control signal CONT21 to the gate driving part 700. The first gate control signal CONT21 may include a vertical start signal and a gate clock signal. In one exemplary embodiment, for example, the first timing controller 610 may provide the gate driving part 700 with the first gate control signal CONT21 including a vertical synchronization signal for selecting a first gate line, a gate clock signal for sequentially selecting a subsequent gate line of the first gate line and an output enable signal for controlling an outputting of the gate driving part 700.

In such an embodiment, the second timing controller 620 generates the second gate control signal CONT22 for controlling an operation of the gate driving part 700 and outputs the eighth control signal CONT22 to the gate driving part 700. The second gate control signal CONT22 may include a vertical start signal and a gate clock signal. In one exemplary embodiment, for example, when 2 m gate lines are disposed in the display panel 500, the second timing controller 620 may provide the gate driving part 700 with a vertical synchronization signal for selecting an (m+1)-th gate line, a gate clock signal for sequentially selecting a subsequent gate line of the (m+1)-th gate line and an output enable signal for controlling an outputting of the gate driving part 700. Here, m is a natural number, and may be greater than one.

The gate driving part 700 generates gate signals for driving gate lines GL in response to the first gate control signal CONT21 received from the first timing controller 610 and the second gate control signal CONT22 received from the second timing controller 620. The gate driving part 700 sequentially outputs the gate signals to the gate lines GL.

In an exemplary embodiment, the gate driving part 700 may be directly mounted on the display panel 500 or connected to the display panel 500 in a tape carrier package ("TCP") type. Alternatively, the gate driving part 700 may be integrated on the display panel 500.

The first timing controller 610 generates the first data control signal CONT31 for controlling an operation of the first data driving part 810 in response to the first input control signal CONT11, and outputs the first data control signal CONT31 to the first data driving part 810. The first data control signal CONT31 may include a horizontal start signal and a load signal.

In one exemplary embodiment, for example, the first timing controller 610 converts the first image signal RGB1 into RGB data signals based on a specification of the first data driving part 810, and outputs the RGB data signals to the first data driving part 810 as the third image signal. In such an embodiment, the first timing controller 610 may generate a horizontal synchronization start signal and a load signal for an output timing of a data signal, and provide the first data driving part 810 with the horizontal synchronization start signal and the load signal.

The second timing controller 620 generates the second data control signal CONT32 for controlling an operation of the second data driving part 820 in response to the second input control signal CONT12 and outputs the second data control signal CONT32 to the second data driving part 820. The second data control signal CONT32 may include a horizontal start signal and a load signal.

In one exemplary embodiment, for example, the second timing controller 620 converts the second image signal RGB2 into RGB data signals based on a specification of the second data driving part 820 and outputs the RGB data signals to the second data driving part 820 as the fourth image signal. In such an embodiment, the second timing controller 620 may generate a horizontal synchronization start signal and a load signal for an output timing of a data signal, and provide the second data driving part 820 with the horizontal synchronization start signal and the load signal.

The first data driving part 810 includes a plurality of source ICs having different channel numbers based on a distance thereof from the first timing controller 610. The first data driving part 810 receives the first data signal DATA1 and the first data control signal CONT31 to output the third image signal and a third data control signal for outputting the third image signal to the display panel 500.

In an exemplary embodiment, the second data driving part 820 includes a plurality of source ICs having different channel numbers based on a distance thereof from the second timing controller 620. The second data driving part 820 receives the second data signal DATA2 and the second data control signal CONT32 to output a fourth image signal and a fourth data control signal for outputting the fourth image signal to the display panel 500. In an exemplary embodiment, the channel of a source IC may correspond to corresponding data lines of the display panel 500. In an exemplary embodiment, the source IC may be mounted on a PCB. Alternatively, the source IC may be mounted in a COG type on the display panel 500.

In an exemplary embodiment, each of the first and second data driving parts 810 and 820 includes a first source IC group IG1, a second source IC group IG2, a third source IC group IG3 and a fourth source IC group IG4.

The first to fourth source IC groups IG1, IG2, IG3 and IG4 shown in FIG. 4 may be substantially the same as the first to fourth source IC groups IG1, IG2, IG3 and IG4 of the exemplary embodiment described with reference to FIGS. 1 to 3B, and thus any repetitive detailed description thereof may hereinafter be omitted.

In an exemplary embodiment, each of the first and second timing controllers 610 and 620 includes a first timing control module T11, a second timing control module T12, a third timing control module T21 and a fourth timing control module T22. The first to fourth timing control modules T11, T12, T21 and T22 shown in FIG. 4 may be substantially the same as the first to fourth timing control modules T11, T12, T21 and T22 of the exemplary embodiment described with reference to FIG. 1, and thus any repetitive detailed description thereof may hereinafter be omitted.

As described above, in an exemplary embodiment of a display device of a dual bank type that data driving parts are respectively disposed in an upper side and a lower side of a display panel, the number of channels of a source IC that is relatively distant from the first and second timing controllers 610 and 620 and has low signal quality is reduced to enhance signal quality, such that a signal is transmitted through a bandwidth that allows a transmission speed of the single to be decreased with respect to a source IC that is relatively near the first and second timing controllers 610 and 620, and the signal quality of a signal transmitted through each channel is thereby improved.

As described above, according to exemplary embodiments of the invention described herein, the number of channels of source IC far from a timing controller is decreased to be less than the number of channels of source IC near the timing controller and a frequency of a clock for synchronizing in the source IC far from the timing controller is decreased to effectively prevent a signal thereof from being deteriorated, such that a signal discrimination of the source IC is increased. In such embodiments, the number of channels corresponding to a side source IC having relatively low signal quality is reduced to enhance signal quality thereof, such that a signal is transmitted through a bandwidth that allows a transmission speed of the signal is decreased with respect to a source IC near the timing controller 200, and the signal quality of a signal transmitted through each channel is thereby improved.

Having described exemplary embodiments of the invention, it is further noted that it is readily apparent to those of reasonable skill in the art that various modifications may be made without departing from the spirit and scope of the invention which is defined by the metes and bounds of the appended claims.

What is claimed is:

1. A display device comprising:

a display panel;

a timing controller which receives a first image signal and a first control signal from an external device and outputs a second image signal and a second control signal;

a data driving part; and a plurality of data lines connected to the data driving part, wherein the data driving part receives the second image signal and the second control signal and outputs a third image signal and a third control signal to the display panel, wherein the data driving part comprises:

a first source integrated circuit group comprising a plurality of first source integrated circuits, each of the first source integrated circuits having a first number of channels;

a second source integrated circuit group comprising a plurality of second source integrated circuits, each of the second source integrated circuits having a second number of channels;

a third source integrated circuit group comprising a plurality of third source integrated circuits, each of the third source integrated circuits having the second number of channels; and a fourth source integrated circuit group comprising a plurality of fourth source integrated circuits, each of the fourth source integrated circuits having the first number of channels, wherein a distance between the timing controller and each of the source integrated circuit groups in which each of the source integrated circuits are included is inversely proportional to the number of channels the respective each of the source integrated circuits has, wherein the distance of the first or fourth source integrated circuit group from the timing controller is greater than the distance of the second or third source integrated circuit group from the timing controller, wherein the plurality of data lines corresponds to the total channels included in the first to fourth source integrated circuit groups, and wherein the first to fourth source integrated circuit groups are disposed on different circuit boards.

2. The display device of claim 1, wherein the second and third source integrated circuit groups are connected to the timing controller through a first cable, the first source integrated circuit group is connected to the second source integrated circuit group through a second cable, and the fourth source integrated circuit group is connected to the third source integrated circuit group through a third cable.

3. The display device of claim 1, wherein the first and second source integrated circuit groups are disposed in a chip-on-glass type on the display panel, the second and third source integrated circuit groups are connected to the timing controller through a cable, the first source integrated circuit group is connected to the second source integrated circuit group through a first conductive wiring disposed on the display panel, and the fourth source integrated circuit group is connected to the third source integrated circuit group through a second conductive wiring disposed on the display panel.

4. The display device of claim 1, wherein the first number of channels is less than the second number of channels.

5. The display device of claim 1, wherein the total number of the data lines corresponding to the first source integrated circuit group is equal to the total number of the data lines corresponding to the fourth source integrated circuit group, and the total number of the data lines corresponding to the second source integrated circuit group is equal to the total number of the data lines corresponding to the third source integrated circuit group.

6. The display device of claim 1, wherein the total number of the first source integrated circuits is greater than the total number of the second source integrated circuits, and the total number of the fourth source integrated circuits is greater than the total number of the third source integrated circuits.

7. The display device of claim 1, wherein a clock frequency of the first source integrated circuits is different from a clock frequency of the second source integrated circuits.

8. The display device of claim 1, wherein a clock frequency of the first source integrated circuits is lower than a clock frequency of the second source integrated circuits.

9. The display device of claim 1, wherein the plurality of data lines connected to the data driving part is disposed on the display panel, the display device further comprises:

a plurality of first connection lines disposed in a first area between the first source integrated circuits and the data lines of the display panel; and a plurality of second connection lines disposed in a second area between the second source integrated circuits and the data lines of the display panel, and a width of the first area is less than a width of the second area.

10. The display device of claim 9, wherein the display device further comprises:

a plurality of third connection lines disposed in a third area between the third source integrated circuits and the data lines of the display panel; and a plurality of fourth connection lines disposed in a fourth area between the fourth source integrated circuits and the data lines of the display panel, and a width of the third area is greater than a width of the fourth area.

11. The display device of claim 1, wherein the plurality of data lines connected to the data driving part is disposed on the display panel, the display device further comprises:

a plurality of first connection lines connected between the first source integrated circuits and the data lines of the display panel; and a plurality of second connection lines connected between the second source integrated circuits and the data lines of the display panel, and an average length of the first connection lines is greater than an average length of the second connection lines.

12. The display device of claim 11, wherein the display device further comprises:

a plurality of third connection lines connected between the third source integrated circuits and the data lines of the display panel; and a plurality of fourth connection lines connected between the fourth source integrated circuits and the data lines of the display panel, and an average length of the third connection lines is less than an average length of the fourth connection lines.

13. The display device of claim 1, wherein the timing controller comprises:

a first timing control module which controls a first operation of the first source integrated circuits;

a second timing control module which controls a second operation of the second source integrated circuits;

a third timing control module which controls a third operation of the third source integrated circuits; and a fourth timing control module which controls a fourth operation of the fourth source integrated circuits.

14. The display device of claim 13, wherein the first to fourth operations of the first to fourth source integrated circuits are synchronized with each other.

15. The display device of claim 13, wherein the second and third timing control modules have a same, first bandwidth as each other, and the first and fourth timing control modules have a same, second bandwidth as each other.

16. The display device of claim 13, wherein a bandwidth of the first timing control module is different from a bandwidth of the second timing control module.

17. The display device of claim 1, wherein a clock frequency of the first and fourth source integrated circuit groups is different from a clock frequency of the second and third source integrated circuit groups.

18. The display device of claim 17, wherein the clock frequency of the first and fourth source integrated circuit groups is lower than the clock frequency of the second and third source integrated circuit groups.

19. The display device of claim 17, wherein each of the second source integrated circuit groups is connected to the timing controller through first cables, and each of the first source integrated circuit groups is connected to each of the second source integrated circuit groups through second cables.

* * * * *